United States Patent [19]

Kataoka

[11] Patent Number: 4,779,700
[45] Date of Patent: Oct. 25, 1988

[54] PASSIVE SEAT BELT ARRANGEMENT FOR A VEHICLE

[75] Inventor: Sachiro Kataoka, Kanagawa, Japan

[73] Assignee: Nissan Motor Company, Limited, Kanagawa, Japan

[21] Appl. No.: 61,437

[22] Filed: Jun. 15, 1987

[30] Foreign Application Priority Data

Jun. 16, 1986 [JP] Japan .................. 61-138394

[51] Int. Cl.$^4$ ............................. B60R 21/10
[52] U.S. Cl. ................... 180/268; 280/801
[58] Field of Search .......... 280/802, 804; 180/268

[56] References Cited

U.S. PATENT DOCUMENTS 4,478,433 10/1984 Taguchi et al. ............ 180/268

FOREIGN PATENT DOCUMENTS 60-6817 2/1985 Japan .

*Primary Examiner*—Kenneth R. Rice

*Attorney, Agent, or Firm*—Lowe, Price, LeBlanc, Becker & Shur

[57] ABSTRACT

A passive seat belt arrangement for a vehicle occupant in which a seat belt fitted around a given body portion of the vehicle occupant sitting on a corresponding seat of the vehicle is automatically transferred to a release state of the seat belt from the given body portion of the occupant only when the vehicle occupant behaves to try to get off the vehicle. To detect that the vehicle occupant behaves to try to get off the vehicle, the passive seat belt arrangement is provided with a door handle switch for detecting an operation state of a door handle installed on a vehicle door positionally corresponding to the seat and a door switch for detecting an open state of the vehicle door. The seat belt is thus transferred to the release state only when both door handle switch and door switch detect the corresponding states. Consequently, the vehicle occupant's safety against an accident is increased.

12 Claims, 3 Drawing Sheets

PASSIVE SEAT BELT ARRANGEMENT FOR A VEHICLE

BACKGROUND OF THE INVENTION

1. Field of the Invention

The present invention relates to a passive seat belt arrangement for a vehicle. The present invention particularly relates to the passive seat belt arrangement for the vehicle wherein a seat belt extending around the vehicle occupant's body is automatically transferred to a release state only when the vehicle occupant starts to try to get off the vehicle seat.

2. Description of the Prior Art

A conventional passive seat belt arrangement for vehicles in which, upon opening open or closure of a vehicle door, a passive-type seat belt for releasably restraining a a vehicle occupant in their seat is automatically released from the occupant or automatically fitted around the occupant's body is exemplified by a Japanese Patent Application Second Publication (Tokkou) Sho No. 60-6817 published on Feb. 20, 1985. In the above-identified Japanese Patent Application Publication, a door locked state detection sensor is provided at a door lock mechanism for detecting whether a door lock operation member of the lock mechanism of the vehicle door is operated and the passive seat belt is, at this time, actuated to release from the occupant's body portion according to a detection result of the door locked state detection sensor and a switched state of a door switch for detecting an open state of the vehicle door.

Therefore, if the vehicle door spontaneously opens and the door switch is turned on due to a deformation of the door, e.g., at the time of collision of the vehicle against an obstacle, the passive seat belt will not be actuated to release from the occupant's body portion due to the installation of the door locked state detection sensor in addition to the door switch. The seat belt is fitted or released to or from the occupant's body portion in response to an actuation operation by means of a seat belt motor only when the door locked state detection sensor detects the release of the door locked state and the door switch detects the open state of the vehicle door is turned on.

In such a conventional passive seat belt arrangement as described above, the above-described automatic release operation of the seat belt from the occupant's body portion will not occur even if the door switch spontaneously turns on due to the deformation of the door at the time of collision against the obstacle so that safety of the vehicle occupant is secured, e.g., against a traffic accident. However, if the occupant or another person fails to lock the door, the effect of automatic release operation of the passive seat belt arrangement cannot be exhibited since the lock mechanism is not operated. Although some automotive vehicles adopt an automatic door lock mechanism interlocked with the vehicle speed, it will lead to increased of a manufacturing cost for such passive seat belt arrangements and will be unsafe below the actuating vehicle speed.

SUMMARY OF THE INVENTION

With the above-described problem in mind, it is an object of the present invention to provide a passive seat belt arrangement for a vehicle which increases a safety of a vehicle occupant with reduction of manufacturing cost.

It is another object of the present invention to provide the passive seat belt arrangement in which an automatic release of the seat belt fitted around the occupant body is carried out upon detection that the vehicle occupant has only an intention to open the door to exit the vehicle through the door, i.e., behaves to try to get out the vehicle.

The above-described objects can be achieved by providing a passive seat belt arrangement for a vehicle, comprising: (a) first means for actuating a seat belt to move in a first state in which the seat belt is fitted around a given body portion of the vehicle occupant on a corresponding seat in response to a first command signal and for actuating the seat belt to move in a second state in which the seat belt is released from the occupant body on the seat in response to a second command signal; and (b) second means for detecting a state in which the vehicle occupant behaves to try to get off the vehicle and for producing and outputting the second command signal to the first means only when detecting the state.

The above-described objects can be achieved by providing a seat belt arrangement for a vehicle, comprising: (a) an actuation member for actuating a seat belt to move at a first end of a roof rail extending along a roof of a vehicle body so that the seat belt becomes a first state in which the seat belt is fitted around a given portion of a body of a vehicle occupant on a corresponding seat and for actuating the seat belt to move at a second end of the roof rail so that the seat belt is released from the given portion of the body of the vehicle occupant on the seat; (b) a door switch for detecting an open state of a vehicle door positionally corresponding to the seat; (c) a door handle switch for detecting an operation state of a door handle provided on the vehicle door; and (d) circuit means for driving the actuation member to actuate the seat belt to move form the first end to the second end of the roof rail when the door handle switch detects the operation state of the door handle and the door switch detects the open state of the vehicle door at least within a predetermined period of time upon the detection of the door handle by means of the door handle switch.

DETAILED DESCRIPTION OF THE PREFERRED EMBODIMENTS

Reference will hereinafter be made to the drawings in order to facilitate understanding of the present invention.

FIGS. 1(a) through 4(b) show a passive seat belt arrangement of a preferred embodiment according to the present invention.

Figure 1A:
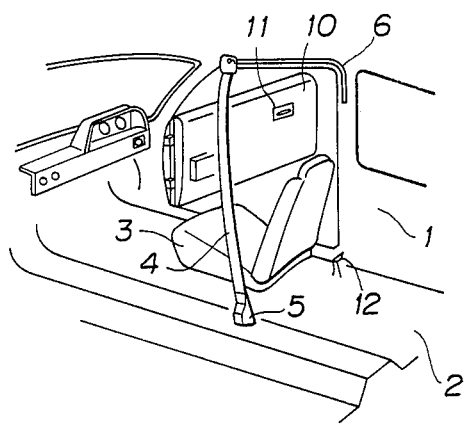
FIG. 1(a) is an overall mechanical outer view of a passive seat belt arrangement for a vehicle in a preferred embodiment according to the present invention.

As shown in FIG. 1(a), a seat belt 4 is installed in close proximity to a seat 3 for a vehicle occupant M. Both seat 3 and seat belt 4 are supported on a floor portion 2 of a vehicle body 1. A lower end of the seat belt 4 is engaged with a seat belt retractor 5 installed on the floor portion 2. On the other hand, an upper portion of the seat belt 4 slidably engages with a roof rail portion 6 extending along a roof of the vehicle body 1.

Figure 2:
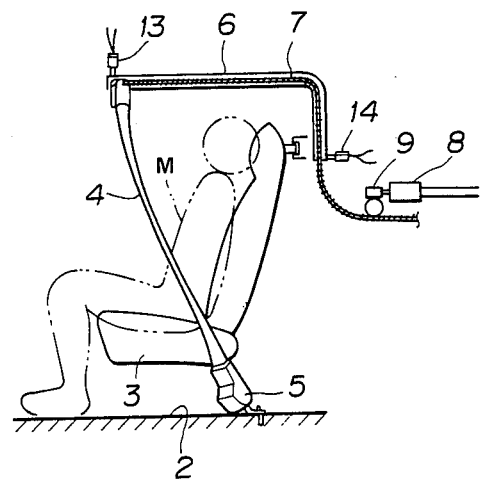
FIG. 2 is an overall mechanical outer view representing a relationship between seat belt movement directions of the passive seat belt arrangement with respect to a vehicle occupant and seat in the preferred embodiment shown in FIG. 1.

The structure of roof rail 6 is well known. As shown in FIG. 2, a spiral wire 7 is housed within the roof rail 6. The upper end of the seat belt 4 is connected to the spiral wire 7. A motor 8 is installed near the roof rail 6 for driving the seat belt 4 to move in a forward and rearward direction with respect to the vehicle body 1 via a worm gear mechanism 9. Hence, when, as shown in a solid line of FIG. 2, the spiral wire 7 is moved in a the forward direction and the upper end of the seat belt 4 is placed at a front end of the roof rail 6, the seat belt 4 is automatically in a become an attachment release state. The attachment release state is defined as a state in which the vehicle occupant M can be released from the fitted seat belt 4. On the other hand, as shown in a phantom line of FIG. 2 located behind a head restraint of the seat 4, when the spiral wire 7 is moved in the rearward direction and the upper end of the seat belt 4 has reached a rear end of the roof rail 6, the seat belt 4 is automatically in an engaged or attachment state. The attachment state is defined as a state in which the seat belt 4 can be fixed around the occupant's body M.

Figure 1B:
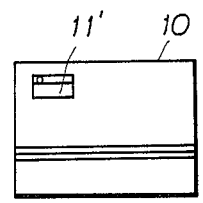
FIG. 1(b) is an outer view of a vehicle door on which another door handle is provided.

In FIG. 1(a), a door 10 is provided with a door handle 11 (although only the door handle in an inner side of the door 10 is shown in FIG. 1(a), another door handle 11' in an outer side of the door 10 with respect to the vehicle body 1 is also included as the door handle 11 as shown in FIG. 1(b).).

In addition, a door switch 12 which turns on (closes) when the door 10 is opened and which turns off (opens) when the door 10 is closed is provided on the floor portion 2 of the vehicle body 1 near the corresponding door 10.

Furthermore, as shown in FIG. 2, a front end position detection switch 13 for detecting the arrival of the seat belt 4 at the front end of the roof rail 6 is installed in the vicinity of the front end of the roof rail 6 and a rear end position detection switch 14 for detecting the arrival of the seat belt 4 at the rear end of the roof rail 6 is also provided in the vicinity of the rear end of the roof rail 6.

Figure 3:
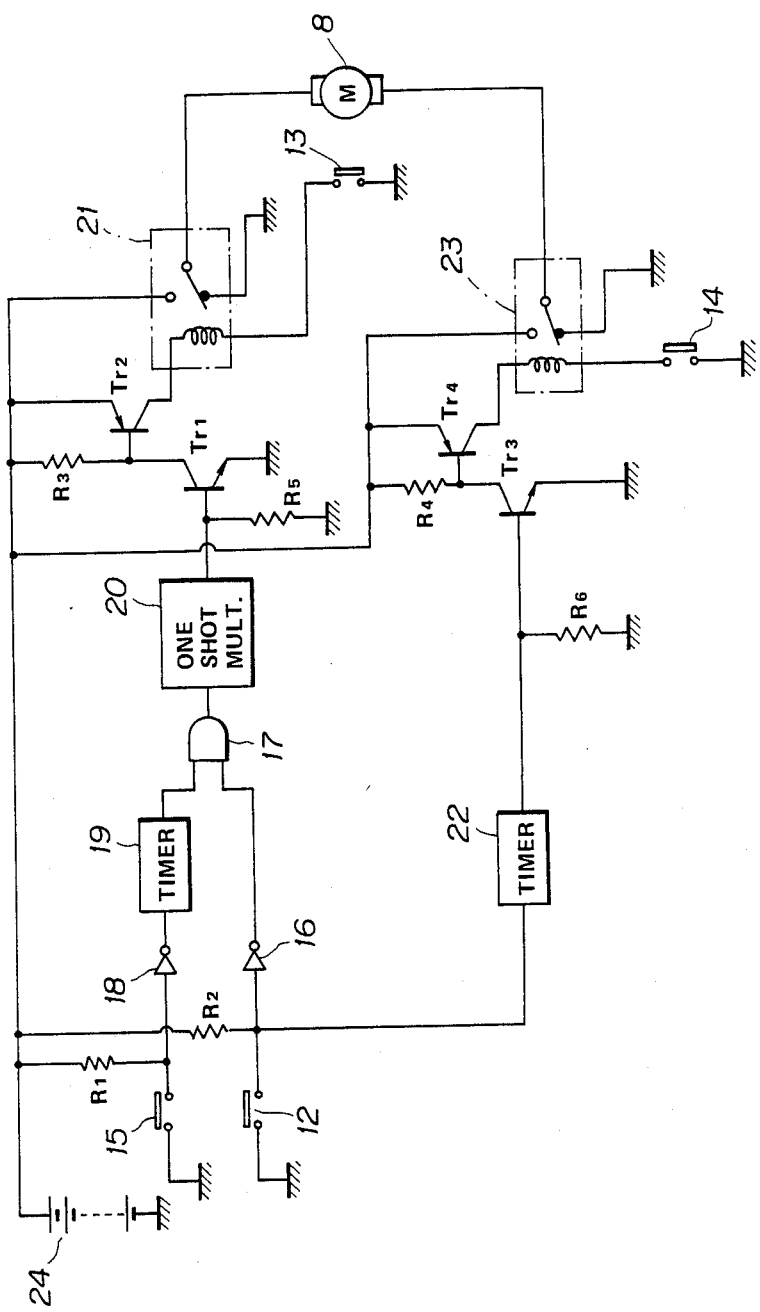
FIG. 3 is an electrical circuit connection diagram of the preferred embodiment of the whole passive seat belt arrangement shown in FIGS. 1 and 2.
Figure 4:
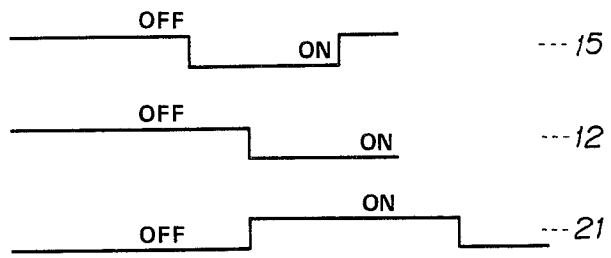
FIG. 4(a) and 4(b) are timing charts for explaining operations of the preferred embodiment shown in FIG. 3.
Figure 4:
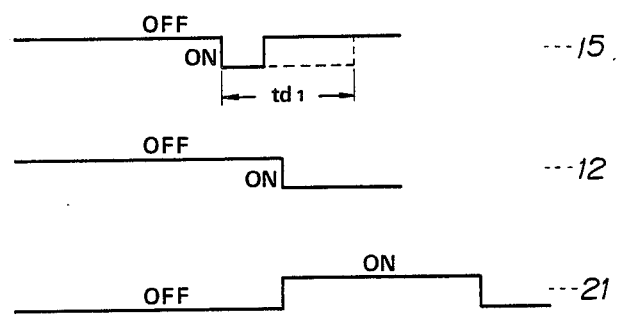

FIG. 3 shows an electrical circuit construction of the passive seat belt arrangement shown in FIGS. 1 and 2.

In FIG. 3, the door switch 12 closes when the door 10 is opened and opens when the door 10 is closed. A handle switch 15 is provided in parallel to the door switch 12. The handle switch 15 turns on only when the occupant operates the handle switch 11 to open the door 10 and normally turns off.

The door switch 12 is connected to an AND gate circuit 17 via an inverter 16. The handle switch 15 is connected to the AND gate circuit 17 via the inverter 18 and timer 19. The timer 19 outputs a high level signal for a constant time td upon the turn on (closure) of the handle switch 15. The output signal of the AND gate circuit 17 is supplied to a base of a transistor Tr1 via a one-shot multivibrator 20. A collector of the transistor Tr1 is connected to a base of a transistor Tr2 for actuating a relay coil of a relay circuit 21. A relay contact of the relay circuit 21 is connected to the motor 8 for driving the seat belt 4. A relay coil of the relay circuit 21 is connected to the front end position detection switch 13 which turns off (opens) when the seat belt 4 has arrived at the front end portion of the roof rail 6.

The door switch 12 is connected to a second timer 22 comprising a one-shot multivibrator. When the door 10 is closed, the second timer 22 outputs a high level signal for a constant period of time td2. The output terminal of the second timer 22 is connected to a base of a transistor Tr3. The transistor Tr3 is connected to a transistor Tr4 for actuating a relay coil of a second relay circuit 23.

The second relay circuit 23 serves to reverse the rotational direction of the motor 8. The switching of the relay contact actuates the drive motor 8 to move the spiral wire 7 in the rearward direction so that the seat belt 4 is transferred in the attachment state. A relay coil of the relay circuit 23 is connected to the rear end position detection switch 14 for detecting the arrival of the seat belt 4 at the rear end of the roof rail 6. It is noted that R1, R2, . . . , and R6 denotes resistors and numeral 24 denote a battery of the vehicle.

The followings are detailed description of operations of the passive seat belt arrangement shown in FIGS. 1 through 3.

(DOOR CLOSED STATE)

When the door 10 is changed from the open state to the closed state, the door switch 12 is changed from the on state to the off state. Hence, a voltage at a terminal of a resistor R2 is changed from the low level to the high level so that the second timer 22 outputs the high level signal for the constant period of time td2. The transistor Tr3 turns on and the transistor Tr4 also turns on. Consequently, the relay circuit 23 becomes the on state. Therefore, a drive current flows through the motor 8 to move the spiral wire 7 in the rearward direction so that the seat belt 4 is transferred in the attachment state. When the rear end position detection switch 14 detects that the seat belt 4 has arrived at the rear end position, the relay coil of the relay circuit 23 turns off to stop the motor 8.

In this way, when the occupant gets in the vehicle, sits on a seat 3 and closes the door 10, the seat belt 4 automatically moves to the attachment state. Thereafter, the occupant M can, e.g., drive the vehicle with his body belted to the seat 3.

(WHEN THE OCCUPANT GETS OFF THE VEHICLE SEAT)

When the seated occupant desires to exit the vehicle with the seat belt 4 in the attachment state and the door 10 being opened, the seat belt 4 automatically becomes moves to the attachment release state in accordance with the following operation.

First, when the occupant operates the door handle 11 to open the door 10, the handle switch 15 fitted to the door handle 11 is transferred from the off state to the on state, as shown in FIG. 4(a). When the handle switch 15 turns on, the voltage inputted to the timer 19 via the inverter 18 becomes the high level and the timer 19 continues the on state for the constant period of time td1. With the door handle switch 15 turned on, the door 10 opens and the door switch 12 is transferred from the on state to the off state. Hence, the output level of the inverter 16 becomes high when the door switch 12 is in the on state and supplied to the AND gate circuit 17. The AND gate circuit 17 outputs the high level signal when the handle switch 15 turns on (closes) and the door switch 12 is turned on (closed) so that the transistor Tr1 is turned on for the constant period of time set by the one-shot multivibrator 20. When the transistor Tr1 is turned on (conducts), the transistor Tr2 also turns on to activate the relay circuit 21.

Hence, the motor 8 is actuated so that the spiral wire 7 is moved forward from the rear end position and the seat belt 4 is released from the attachment state. The forward movement of the seat belt 4 is carried out until the forward end position detection switch 13 is operated to reactivate the relay circuit 21.

In this way, the seat belt 4 is automatically transferred from the attachment state to the attachment release state so that the occupant is released from the seat 3 so as to exit the vehicle.

On other hand, when the door 10 is deformed due to the collision the door is opened without the operation of the door handle 11 or the door switch is turned on, the handle switch 15 is held in the off state. Hence, one input of the AND gate circuit 17 is always held at the low level so that the transistor Tr1 will not be turned on. Consequently, the seat belt 4 will not automatically be released due to the on operation of the door switch 12 so that the safety of the occupant can be assured.

When the door 10 is abruptly opened, the door is instantaneously opened with the door handle 11 pulled in the inner direction of the vehicle body 1 for a short period of time. Hence, as shown in FIG. 4(b), the handle switch 15 is turned on for the short period of time so that the door switch 12 often turns on after the handle switch 15 is returned to the on state. However, in such a case, the AND gate circuit 17 will not pass the high level signal if the timer 19 holds the on state for the constant time td1 regardless of the subsequent on and off states of the handle switch 15 once the handle switch 15 is turned on so that the release operation of the seat belt 4 can be carried out together with the opening and closing of the door even if the occupant carries out the abrupt opening of the door 10.

In this way, an intention of the occupant to exit the vehicle is recognized from both operations of the door handle 11 and opening of the door 10 so that when the door handle 11 is pulled toward the inner side of the vehicle body 1 and simultaneously or within the constant period of time upon the operation of the door handle 11 the door 10 is opened, the release of the fitted seat belt 4 can automatically be carried out.

Figure 5:
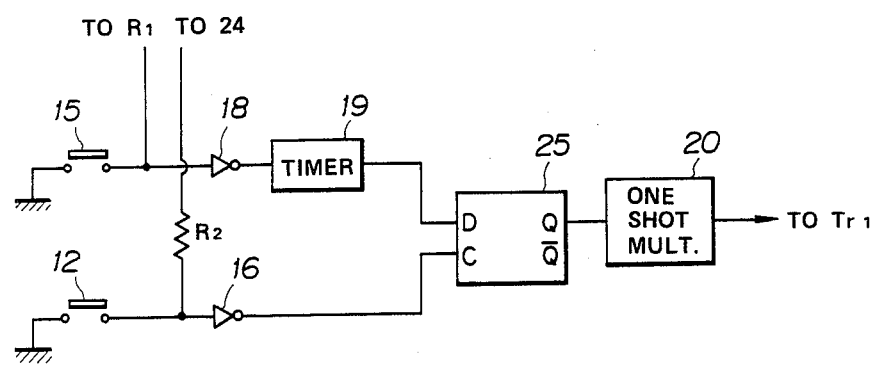
FIG. 5 is an electrical circuit connection diagram of another preferred embodiment of the passive seat belt arrangement according to the present invention.

FIG. 5 shows a circuit configuration of another preferred embodiment of the passive seat belt arrangement according to the present invention.

In the other preferred embodiment shown in FIG. 5, a D type flip-flop circuit 25 is provided in place of the AND gate circuit 17 in the preferred embodiment shown in FIG. 3. The other constructions of the electrical circuit are the same as those shown in FIG. 3.

A D input of the D type flip-flop circuit 25 receives the output signal of the timer 19 connected to the door handle switch 15 via the inverter 18. A C (clock) input of the D type flip-flop circuit 25 receives the output signal of the inverter 16 connected to the door switch 12. Hence, when the door handle 11 is operated and the handle switch 15 is turned on, a high level signal is applied to the D input of the D type flip-flop circuit 25 via the inverter 18 and the timer 19. Then, when the door 10 is opened and the door switch 12 is turned on, a rising edge of the output signal of the inverter 16 is inputted to the C input of the D type flip-flop circuit 25 so that the output Q of the circuit 25 outputs the high level signal so that the transistor Tr1 is actuated to turn on via the one-shot multivibrator 20 and the relay circuit 21 is actuated. Consequently, the motor 8 is actuated to enable the release of the seat belt 4.

Since in the other preferred embodiment only when the door handle 11 is first operated and thereafter the door 10 is opened, the motor 8 is actuated, an erroneous operation of the seat belt 4 due to the deformation of the door 10 can more accurately be prevented.

As described hereinabove, since the passive seat belt arrangement according to the present invention operates the release of the seat belt which has been fitted around the occupant body only when the occupant tries to get off the vehicle seat and operates the door handle 11, the release operation of the seat belt will not occur even if the door is deformed due to the closure of the door switch caused by the collision against the obstacle. Consequently, a high safety feature of the passive seat belt arrangement can be assured.

It will fully be appreciated by those skilled in the art that the foregoing description is made in terms of the preferred embodiments and various changes and modifications may be made without departing from the scope of the present invention which is to be defined by the appended claims.

What is claimed is:

1. A passive restraint seat belt arrangement for a vehicle, comprising:
    (a) first means for actuating a seat belt to move in a first state, in which first state the seat belt can be fitted around a vehicle occupant's body seated on a vehicle seat, in response to a first command signal and for actuating the seat belt to move in a second state, in which second state the seat belt is released from the occupant's body on the seat, in response to a second command signal; and
    (b) second means for detecting movement of the vehicle occupant indicative of the occupant's efforts to get off the vehicle seat and for producing and outputting the second command signal to the first means only when detecting the said movement.

2. A seat belt arrangement for a vehicle, comprising:
    (a) first means for actuating a seat belt to move in a first state, in which first state the seat belt can be fitted around a vehicle occupant's body seated on a vehicle seat, in response to a first command signal and for actuating the seat belt to move in a second state, in which second state the seat belt is released from the occupant's body on the seat, in response to a second command signal; and
    (b) second means for detecting a state in which the vehicle occupant behaves to try to get off the vehicle seat and for producing and outputting the second command signal to the first means only when detecting the state, wherein the second means includes a door handle switch which closes when a door handle which operatively opens a vehicle door positionally corresponding to the occupant seat is operated and a door switch which closes when the vehicle door is opened, and wherein the second means outputs the second command signal only when both the door handle switch and door switch close.

3. The seat belt arrangement according to claim 2, wherein the second means outputs the second command signal only when both the door handle switch and door switch close at the same time.

4. The seat belt arrangement according to claim 2, wherein the second means outputs the second command signal only when the door handle switch closes and the door switch closes within a predetermined period of time upon the closure of the door handle switch.

5. The seat belt arrangement according to claim 2, wherein the door handle is located on an inner side wall of the vehicle door with respect to a vehicle body.

6. A seat belt arrangement for a vehicle comprising:
(a) an actuation member for actuating a seat belt to move at a first end of a roof rail extending along a roof of a vehicle body so that the seat belt moves to a first state in which the seat belt may be fitted around a vehicle occupant's body on a corresponding seat and for actuating the seat belt to move to a second end of the roof rail so that the seat belt is released form the vehicle occupant's body on the seat;
(b) a door switch for detecting an open state of a vehicle door positionally corresponding to the seat;
(c) a door handle switch for detecting an operation state of a door handle provided on the vehicle door; and
(d) circuit means for driving the actuation member to actuate the seat belt to move from the first end to the second end of the roof rail when the door handle switch detects the operation state of the door handle and the door switch detects the open state of the vehicle door at least within a predetermined period of time upon the detection of the door handle by means of the door handle switch.

7. The seat belt arrangement according to claim 6, wherein the actuation member includes a reversible motor.

8. The seat belt arrangement according to claim 7, wherein the circuit means includes (a) a timer which outputs a first signal for the predetermined period of time in response to the detection of the door handle operation state by the door handle switch; and (b) an AND gate circuit which outputs a second signal upon receipt of the first signal and a detection signal indicating the door open state from the door switch and wherein the motor is driven to move the seat belt toward the second end of the roof rail in response to the second signal from the AND gate circuit.

9. The seat belt arrangement according to claim 7, wherein the circuit means includes (a) a timer which outputs a first signal for the predetermined period of time in response to the detection of the door handle operation state by the door handle switch; and (b) a D-type flip-flop circuit which outputs a second signal when the first signal is received at a D input terminal thereof and thereafter a detection signal indicating the door open state from the door switch is received at a C (clock) input terminal thereof and wherein the motor is driven to move the seat belt toward the second end of the roof rail in response to the second signal from the D-type flip-flop circuit.

10. A seat belt arrangement for a vehicle, comprising:
(a) first means for actuating a seat belt to move in a first state in which the seat belt can be fitted around a vehicle occupant's body on a corresponding seat in response to a first command signal and for actuating the seat belt to move in a second state in which the seat belt is unfastened in response to a second command signal; and
(b) second means for detecting a state in which the vehicle occupant behaves to try to get (1) off the vehicle seat or (2) in the vehicle to take his seat and for producing and outputting the second command signal when detecting one of both states.

11. The seat belt arrangement according to claim 10, wherein the second means includes a door handle switch which closes when a door handle which operatively opens a vehicle door positionally corresponding to the occupant seat is operated and a door switch which closes when the vehicle door is opened, and wherein the second means outputs the second command signal only when both the door handle switch and door switch close.

12. The seat belt arrangement according to claim 11, wherein the door handle is located on an outer side wall of the vehicle door with respect to a vehicle body.

* * * * *